US012636664B2

(12) United States Patent
Vanbecelaere et al.

(10) Patent No.: US 12,636,664 B2
(45) Date of Patent: May 26, 2026

(54) TRIGGER SPRAYER VENTING SYSTEMS AND METHODS FOR USING THE SAME

(71) Applicant: SILGAN DISPENSING SYSTEMS CORPORATION, Richmond, VA (US)

(72) Inventors: Jacob Vanbecelaere, Olathe, KS (US); Zachary Tyler, Kansas City, MO (US)

(73) Assignee: Silgan Dispensing Systems Corporation, Richmond, VA (US)

( * ) Notice: Subject to any disclaimer, the term of this patent is extended or adjusted under 35 U.S.C. 154(b) by 155 days.

(21) Appl. No.: 18/294,731

(22) PCT Filed: Aug. 16, 2022

(86) PCT No.: PCT/US2022/074990
§ 371 (c)(1),
(2) Date: Feb. 2, 2024

(87) PCT Pub. No.: WO2023/023495
PCT Pub. Date: Feb. 23, 2023

(65) Prior Publication Data

US 2024/0335850 A1 Oct. 10, 2024

Related U.S. Application Data

(63) Continuation of application No. 17/404,433, filed on Aug. 17, 2021, now Pat. No. 11,691,166.

(51) Int. Cl.
*B05B 11/00* (2023.01)
*B05B 11/10* (2023.01)

(52) U.S. Cl.
CPC ....... *B05B 11/1011* (2023.01); *B05B 11/0044* (2018.08)

(58) Field of Classification Search
CPC ............. B05B 11/1011; B05B 11/0044; B05B 11/0008; B05B 1/3415; B05B 15/30; B05B 11/1067
See application file for complete search history.

(56) References Cited

U.S. PATENT DOCUMENTS 5,385,302 A * 1/1995 Foster ..................... B05B 15/30 222/207
5,425,482 A * 6/1995 Foster ................. B05B 11/1069 222/207
5,752,626 A * 5/1998 Bachand ............. B05B 11/1011 239/304
9,808,819 B2 * 11/2017 Tada ................... B05B 11/1066
2006/0086763 A1 * 4/2006 Foster ................. B05B 11/1011 222/383.1
2007/0290005 A1 * 12/2007 Foster ................. B05B 11/1074 222/383.1

* cited by examiner

*Primary Examiner* — Vishal Pancholi
(74) *Attorney, Agent, or Firm* — Hinckley Allen & Snyder; Stephen Holmes

(57) ABSTRACT

A trigger sprayer having a venting system including a piston bore and a vent bore at least partially contained therein, the vent bore including at least one vent port; a piston and vent piston are moveably seated in the piston bore and vent bore, respectfully, the vent piston including at least one annular seal and a vent path port, the vent path port and vent port in gaseous communication when the vent piston is actuated and moved over the vent port.

8 Claims, 11 Drawing Sheets

TRIGGER SPRAYER VENTING SYSTEMS AND METHODS FOR USING THE SAME

BACKGROUND OF THE INVENTION

Field of the Invention: Embodiments of the invention relate to dispensing devices for pumps, sprayers, and dispensers and more particularly to venting systems for trigger sprayers.

Description of Related Art: Dispensing devices are commonly used to dispense a fluid product from a container, such as a bottle, to the atmosphere where the fluid product is utilized. Dispensers may include fine mist sprayers, pumps having accumulators, trigger sprayers, or the like. Many such devices include a venting system to allow the pressure within the container to equalize with atmospheric pressure when in use.

A typical trigger sprayer includes a valve body defining a piston chamber with a piston seated therein and a valve system configured to regulate flow of fluid into and out of the piston chamber as a trigger- or lever-attached to the piston is moved. The valve body may be attached to a bottle or container and a dip tube or other fluid flow path may facilitate the transfer of liquid from the bottle or container into the valve body and piston chamber as the trigger is actuated. A dispensing orifice in fluid communication with the piston chamber dispenses the product being pumped or moved by the actuation of the trigger and movement of the piston. A venting path is typically included in the valve body or other portion of a trigger sprayer to allow the pressure in the bottle or container to which the trigger sprayer is attached to equalize with atmospheric pressure.

Trigger sprayers similar to those disclosed in U.S. Pat. Nos. 5,779,108 and 6,095,377 include vent paths and pistons configured to improve the venting process for the systems with which such trigger sprayers are used. While such trigger sprayers provide advantageous venting systems, issues with such venting configurations remain.

Traditional trigger sprayer venting systems are not ideal for the rigors associated with new e-commerce delivery systems which are becoming the standard for delivery of such trigger sprayers. Unlike traditional practices where bottles or containers filled with a product and fitted with trigger sprayers are packed in boxes and secured on pallets for shipment, storage, and placement on store shelves in an upright position, e-commerce shipping methods subject filled bottles with trigger sprayers to rigorous movement, directional changes, and no guaranteed orientation during shipping. As a result, traditional venting features, when subjected to e-commerce shipping methods, may leak. Such leaks are not tolerated by many e-commerce market shippers and shipping standards and tests are fast becoming commonplace and required before products may be sold and shipped through many e-commerce markets.

For example, trigger sprayers similar to those disclosed in the U.S. Patents referenced above have been found to undergo valve body deflection during shipping in and around the piston bore which can result in the break of the seal between the piston and the valve body, allowing product to leak from the vent path and through the piston bore, past the piston chevrons, and into the package in which such trigger sprayer is being shipped. Repeated application of forces during shipping can result in a large amount of fluid or product leaking from the trigger sprayer and associated bottle or container which is highly undesirable.

New shipping standards have been adopted to counter such leaking. In order to meet those standards, new shipping methods are utilized with dispensers in an attempt to avoid leaking. In some instances, bottles containing a product are sealed and closed with a threaded closure and a trigger sprayer or pump is included in the shipping box such that the end user must remove the cap on the bottle, throw it away, and attach the included trigger sprayer or pump to the bottle before first use. This results in additional waste—the additional cap shipped to seal the bottle—and additional costs for packing and shipping such products. In other instances, bottles having dispensers with traditional venting paths that may leak are packed in a secondary bag or package to capture any leak and to prevent such leak from spreading to the outer packaging, again, adding costs to the overall packaging, creating an undesirable mess for the consumer, and increasing the amount of waste produced.

It is therefore desirable to provide a venting path that is less likely to leak when subjected to standard e-commerce shipping stresses. It is also desirable to develop trigger sprayers, pumps, and other dispensers having vent paths that are less likely to leak or which may help reduce the possibility of leaks during e-commerce shipping or when forces such as those applied to a product during shipping are applied to products with such vent paths. It is also desirable to provide improved vent systems which will eliminate the need for, and use of, additional packaging materials when shipping such dispensers and trigger sprayers.

BRIEF SUMMARY OF THE INVENTION

According to certain embodiments of the invention, a dispensing device includes a trigger sprayer having a piston bore and a vent bore interior of the piston bore. A piston seated in the piston bore includes a vent piston extending into and seated in the vent bore. The vent piston portion may be part of the piston or may be a separate vent piston attached to the piston. The vent piston may include a vent piston body having at least one annular vent seal and a vent piston open end. A vent path port in the vent piston body may be located adjacent the at least one annular vent seal. In some embodiments, the vent piston portion may include two annular vent seals and the vent path port may be located between the two annular vent seals. The vent path port is in gaseous or fluid communication with a vent path defined by the vent piston body and terminating at the vent piston open end. The vent piston open end may be in fluid or gaseous communication with an opening in the piston such that the vent path port is always in fluid or gaseous communication with atmosphere through the vent path and the opening in the piston.

The vent bore of a trigger sprayer according to various embodiments of the invention may include an interior vent bore surface, a vent bore opening at one end opening into an interior space defined by the piston bore, a vent bore wall opposite the vent bore opening, and at least one vent port. The at least one vent port through the vent bore may be located within the vent bore, and in particular embodiments, it may be located closer to the vent bore wall than the vent bore opening. In some embodiments, two vent ports may be located at an end of the vent bore adjacent to the vent bore wall.

When a piston is moved, for example by actuation of a trigger attached to or in communication with the piston to effectuate movement thereof, the vent piston is also moved. In certain embodiments, when a first annular vent seal of the vent piston moves in the vent bore and slides over a vent port, a gaseous or fluid path from atmosphere is opened to the vent port, allowing air to pass through the piston, into the vent path of the vent piston, out the vent path port and through the vent port in the vent bore. Air flowing through the vent port in the vent bore may enter a bottle or container to which the trigger sprayer is attached, effectively venting the bottle or container. During such actuation and opening of the vent port to atmosphere, a second annular vent seal on the vent piston may stop short of reaching the vent port such that the second annular vent seal prevents air from escaping or passing the second annular vent seal. This second annular vent seal may also prevent fluid from passing from the vent bore into the piston bore. For example, if, during shipping or use, fluid from within a bottle or container to which the trigger sprayer is attached passes through the trigger sprayer and through the vent port into a portion of the vent bore, the presence of a second annular vent seal helps to prevent such fluid from flowing into the piston bore.

Return of the piston to the rest position following actuation returns the annular vent seal to the rest position where the vent port is no longer in communication with the vent port path, closing off the gaseous or fluid communication between atmosphere and an interior of the trigger sprayer and bottle or container. In this position, fluid flowing through the vent port into the vent piston bore is prevented from leaking or passing out of the trigger sprayer through the vent path.

In some embodiments of the invention, a venting piston is provided having traditional piston features and additional venting piston features. A venting piston may include a vent path through the venting piston with a vent path port positioned adjacent to at least one annular vent seal extending off of the venting piston. In some embodiments, a vent path port may be located between two annular vent seals extending away from the venting piston body. The venting piston may be seated in a piston bore having both a fluid piston portion and a venting portion such that the at least one annular vent seal seats and moves in the venting portion during operation of a dispenser incorporating said venting piston. One or more vent ports in the venting portion may be opened to the vent path port and atmosphere when at least one of the annular vent seals passes over the vent port.

In other embodiments of the invention, the configuration of the vent bore and piston bore and movement of the piston and vent piston therein may be changed or customized to fit the particular trigger sprayer, pump, or dispenser utilizing embodiments of the venting system of the invention. In addition, the positions of the vent ports may be adjusted and configured to provide an easy molding or assembly process in order to reduce costs associated with integrating embodiments of the venting system into such trigger sprayers, pumps, or dispensers.

According to various embodiments of the invention, the inclusion of the vent bore and the vent piston in the trigger sprayer may improve the leak-proof nature or qualities of the trigger sprayer, allowing such trigger sprayers to be shipped in e-commerce market streams without the need for additional packaging or leak protections.

BRIEF DESCRIPTION OF THE SEVERAL VIEWS OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

Figure 1:
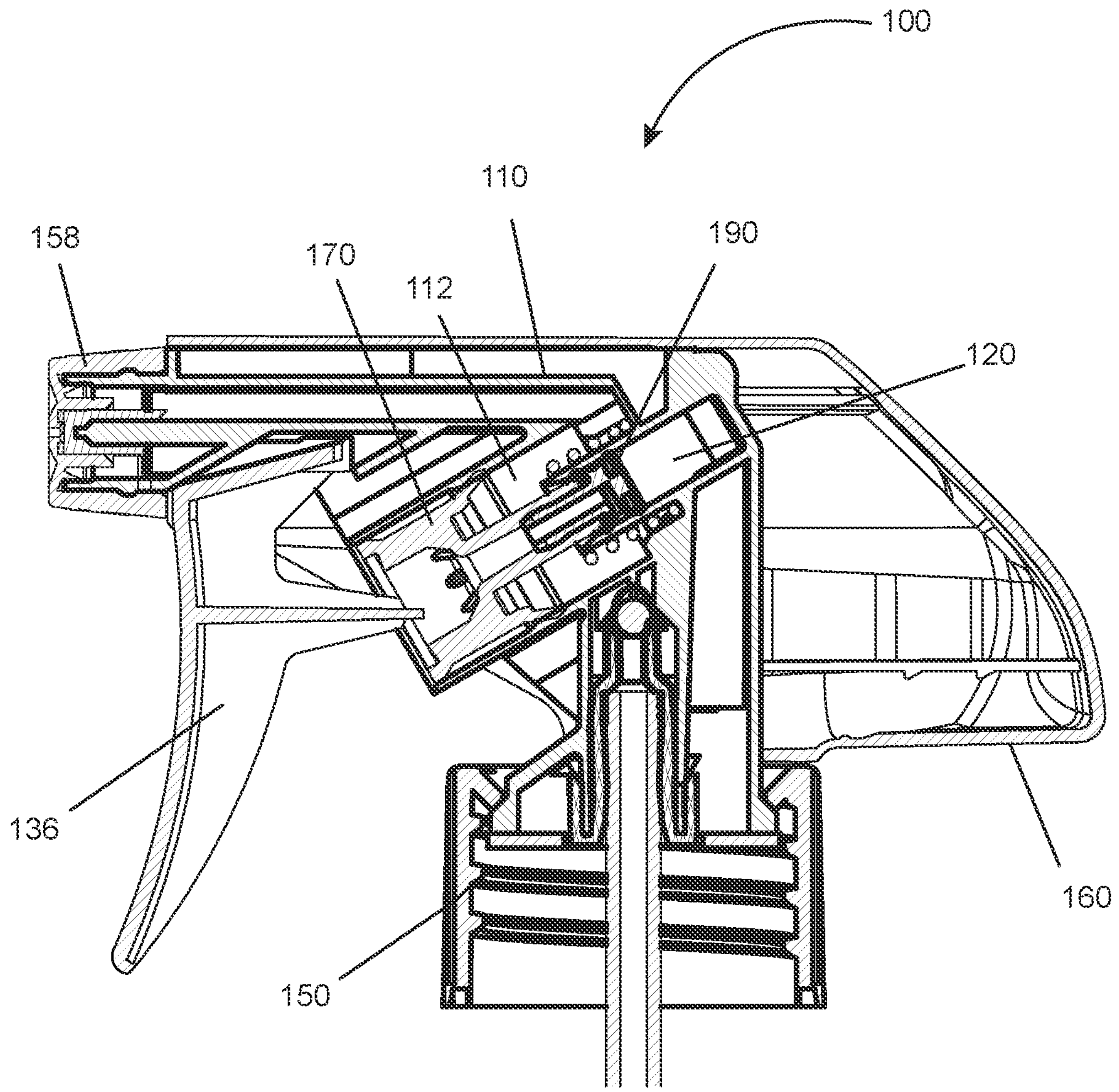
FIG. 1 illustrates a cross-sectional view of a trigger sprayer according to various embodiments of the invention.
Figure 2:
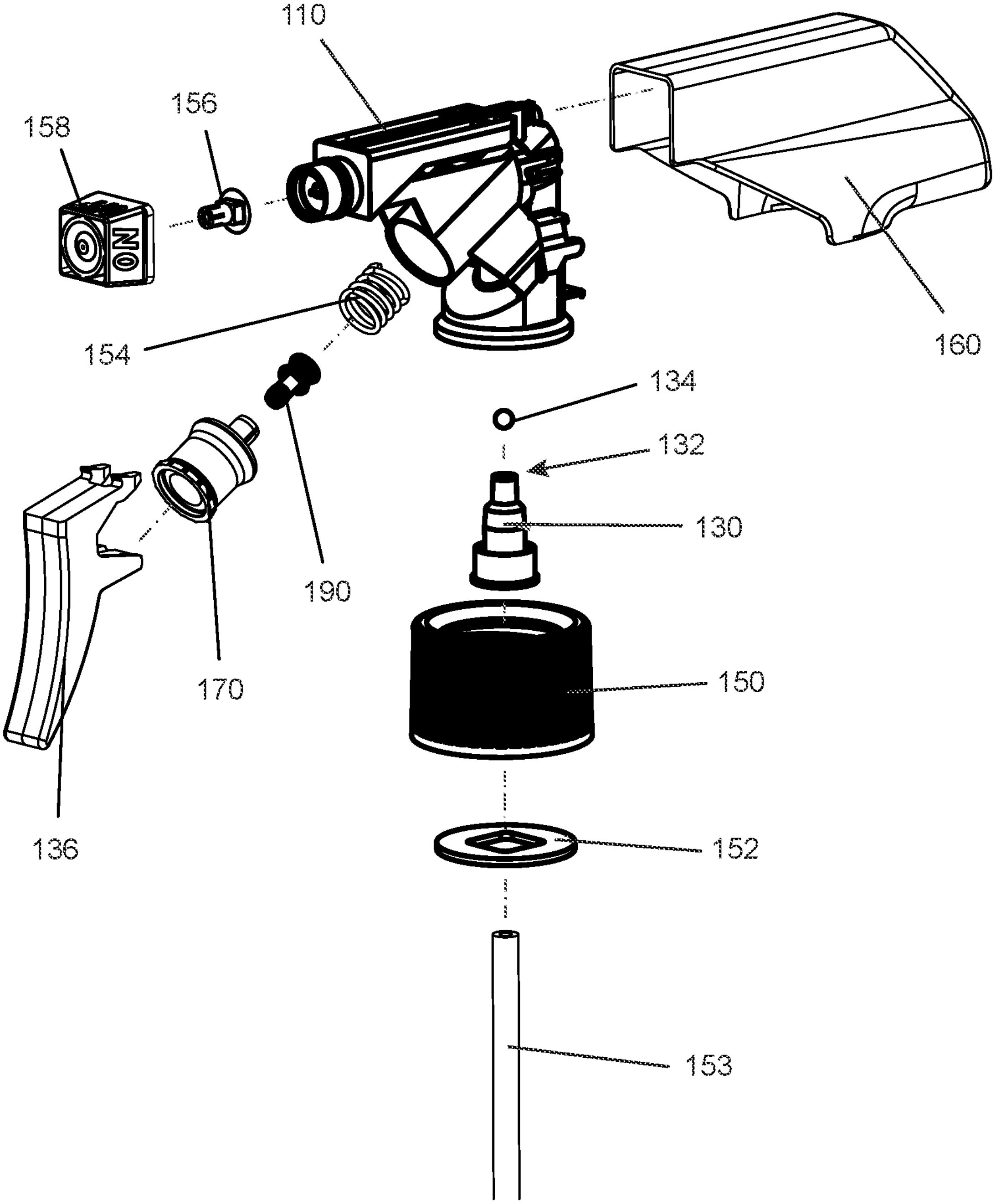
FIG. 2 illustrates a blown-apart assembly drawing of the trigger sprayer illustrated in FIG. 1 according to various embodiments of the invention.

A cross-sectional view of a trigger sprayer 100 according to various embodiments of the invention is illustrated in FIG. 1 and a blown-apart assembly drawing of the trigger sprayer 100 is illustrated in FIG. 2. As illustrated, a trigger sprayer 100 according to embodiments of the invention may include a valve body 110, a tube retainer 130, a valve 134, a trigger 136, a closure 150, a gasket 152, a dip tube 153, a spring 154, a spin mechanic insert 156, a nozzle 158, a shroud 160, a piston 170, and a vent piston 190.

A trigger sprayer 100 according to embodiments of the invention may be assembled in a traditional way and as illustrated in the cross-sectional views illustrated in FIGS. 1 and 2. In some embodiments of the invention, conventional components such as the tube retainer 130, valve 134, trigger 136, closure 150, gasket 152, dip tube 153, spring 154, nozzle 158, shroud 160, and spin mechanic insert 156 may be used in the assembly of a trigger sprayer 100.

Figure 4:
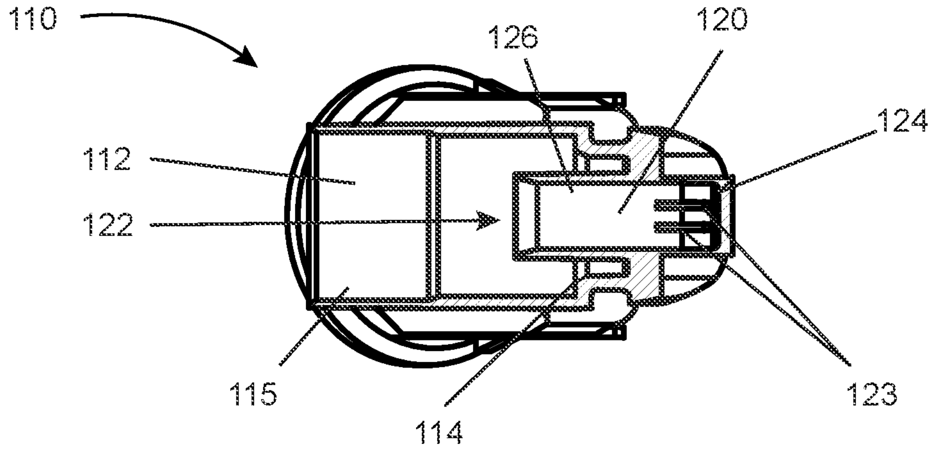
FIG. 4 illustrates a cross-sectional view of the valve body illustrated in FIG. 3 along line M-M.

According to some embodiments of the invention, the valve body 110 includes a piston bore 112 configured with an opening 113 in one end and a piston wall 114 in an opposite end of the piston bore 112. A vent bore 120 is partially surrounded by the piston bore 112 or may be contained at least partially within the piston bore 112 such that a vent bore opening 122 is located within an interior space defined by the piston bore 112. The vent bore 120 may include the vent bore opening 122, a vent bore wall 124 at an end of the vent bore 120 opposite the vent bore opening 122, and an interior vent bore surface 126. At least one vent port 123 through the vent bore 120 may have an opening in the interior vent bore surface 126 as illustrated in FIG. 4.

While various embodiments include a vent bore 120 having a vent bore opening 122 located within an interior space of the piston bore 112, other embodiments include a vent bore 120 extending off the piston bore wall 114 such that the vent bore opening 122 may be located in the piston bore wall 114.

Figure 3:
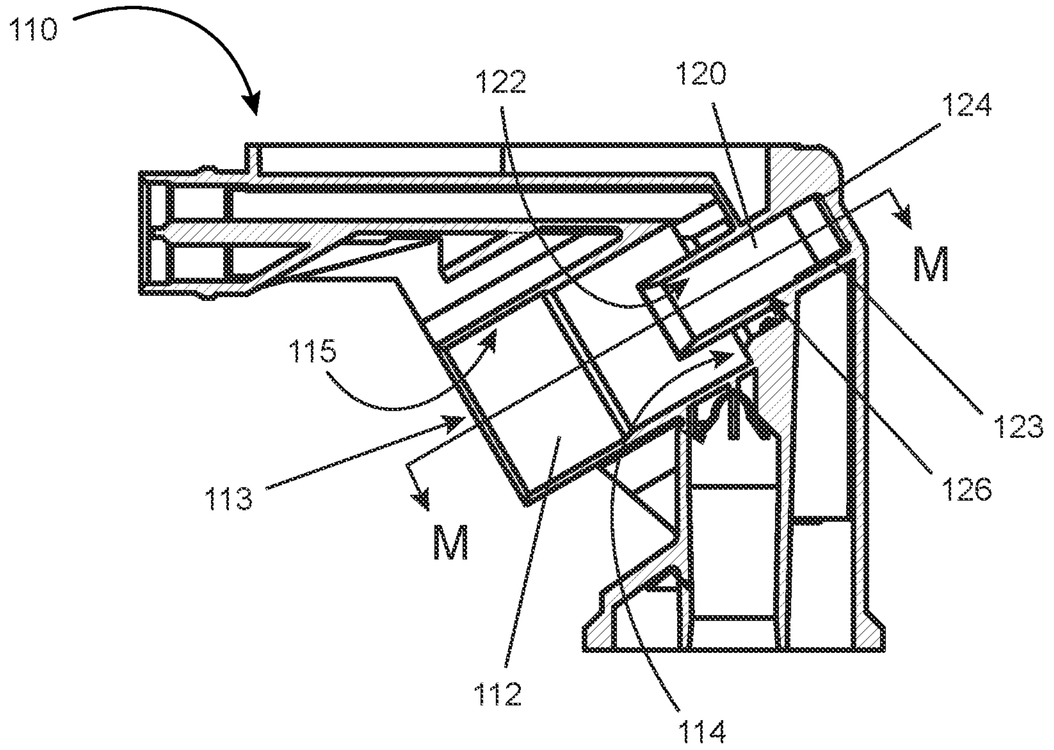
FIG. 3 illustrates a cross-sectional view of a valve body of a trigger sprayer according to various embodiments of the invention.

FIG. 3 illustrates a cross-sectional view of a valve body 110 according to certain embodiments of the invention showing a particular configuration of a piston bore 112 and vent bore 120. As illustrated, the piston bore 112 may be cylindrical in shape and includes an opening 113 and a piston bore wall 114 opposite the opening 113 with an interior piston bore surface 115 between the opening 113 and the piston bore wall 114. A vent bore 120 is also formed in the valve body 110, the vent bore 120 having a vent bore opening 122 residing within the interior space of the piston bore 112 and a vent bore wall 124 formed in the valve body 110 opposite the vent bore opening 122. An interior vent bore surface 126 runs between the vent bore opening 122 and the vent bore wall 124. At least one vent port 123 is formed through the vent bore 120 and is open to an interior space or venting space 151 of the valve body 110.

A valve body 110 according to embodiments of the invention may also include a neck portion into which a tube retainer 130 may be inserted or retained. An inner cylinder adjacent an inlet port of the valve body 110 may be configured to bring fluid from a container or bottle into the valve body 110 through a tube retainer and into the piston bore 112. A discharge passage in the valve body 110 may be connected to or open to the piston bore 112 and may pass fluid or product from the piston bore 112 out of an outlet port in the end of the valve body 110 adjacent a nozzle 158.

FIG. 4 illustrates a cross-sectional view of the valve body 110 illustrated in FIG. 3 along line M-M, said line bisecting the piston bore 112 and the vent bore 120. As shown, the piston bore 112 includes an opening 113 and a piston bore wall 114 at an end of the piston bore 112 opposite the opening 113. The vent bore opening 122 is located within an interior space of the piston bore 112 and the vent bore 120 is formed in the valve body 110. Two vent ports 123 are illustrated in a bottom portion of the vent bore 120 and the vent ports 123 open into a venting space 151 defined in the valve body 110. Other vent port 123 configurations may be used with various embodiments of the invention.

As illustrated in FIGS. 3 and 4, the piston bore 112 may include a chamfered or beveled edge along the opening 113 thereof. Similarly, the vent bore 120 may include a chamfered or beveled edge along the vent bore opening 122. A beveled or chamfered edge located at the opening 113 or the vent bore opening 122 may allow a piston 170 or vent piston 190 to more easily enter the piston bore 112 or vent bore 120 during assembly of the trigger sprayer 100.

In some embodiments of the invention, a vent bore 120 may include a two vent ports 123 as illustrated in FIG. 4. In other embodiments, a vent bore 120 may have a single vent port 123. In still other embodiments, a plurality of vent ports 123 may be included in or through a vent bore 120. As illustrated in FIG. 4, one or more vent ports 123 may be positioned in the vent bore wall 124 in a rear portion or section of the vent bore 120. In some embodiments, one or more vent ports 123 may be adjacent to the vent bore wall 124. In other embodiments, one or more vent ports 123 may be closer to the vent bore wall 124 than to the vent bore opening 122. The location of a vent port 123 around the interior vent bore surface 126, whether singular or part of a plurality, may be varied such that a vent port 123 may be located in a position that is easiest to produce during the manufacture or molding of a valve body 110. As illustrated in FIG. 4, the two vent ports 123 are located in a portion of the vent bore 120 facing an opening in the valve body 110 and which is accessible to a tool or slide during molding of the valve body 110 such that the vent ports 123 may be easily formed at the time of molding the valve body 110 using conventional molding practices. For example, a tool having a slide or other feature to create the vent ports 123 during molding may be projected off of that portion of the tool forming the venting space 151 in the valve body 110.

Figure 5:
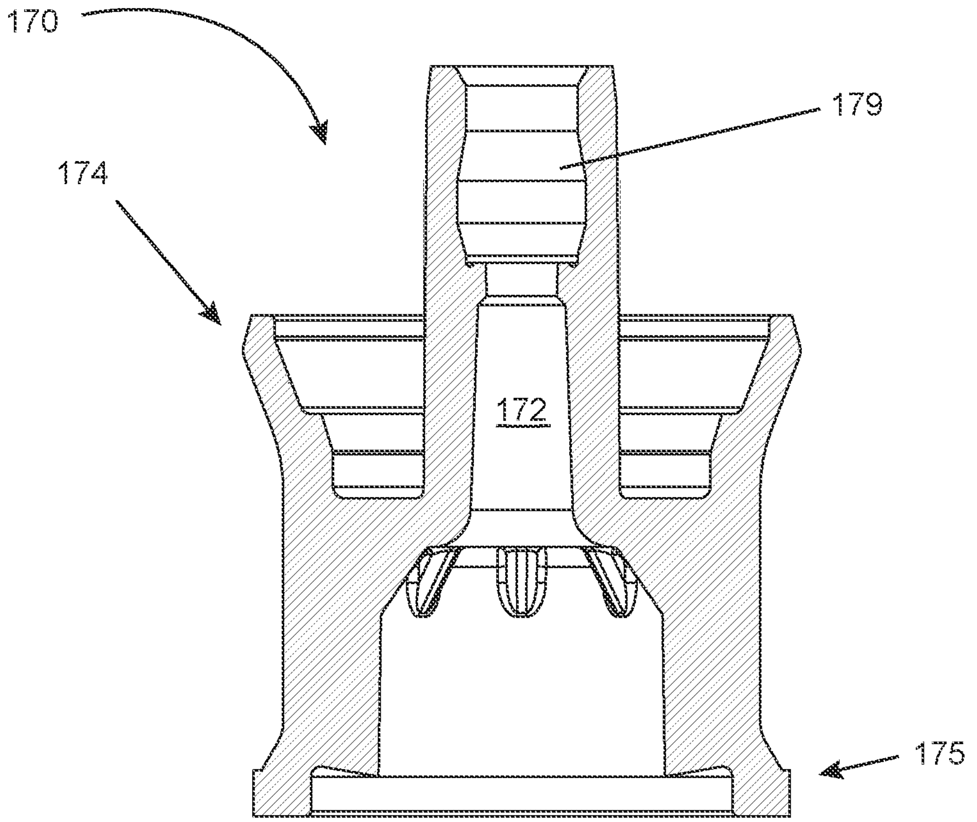
FIG. 5 illustrates a cross-sectional view of a piston according to certain embodiments of the invention.

A piston 170 according to embodiments of the invention may be very similar to conventional pistons used with trigger sprayers. Unlike conventional pistons, however, a piston 170 according to embodiments of the invention includes an air passageway 172 through the piston 170. An example of a piston 170 having such an air passageway 172 according to certain embodiments of the invention is illustrated in FIG. 5. As shown, the air passageway 172 extends from a first end of the piston 170 where a trigger 136 engages the piston 170 through to an opposite second end of the piston 170 and generally along the central axis of the piston 170. While the air passageway 172 illustrated may be used with certain embodiments of the invention, other air passageway 172 configurations could also be used with embodiments of the invention as long as the air passageway 172 through the piston 170 to the vent path 194 in a connected or integrated vent piston 190 exists.

A piston 170 according to embodiments of the invention may also include a vent piston seat 179. An example of a vent piston seat 179 according to embodiments of the invention is illustrated in FIG. 5. The vent piston seat 179 may be configured to mate with, retain, or connect to a vent piston 190. The vent piston seat 179 may be located in a vent piston extension extending off of the piston 170 away from the opening in the first end of the piston 170.

Figure 6:
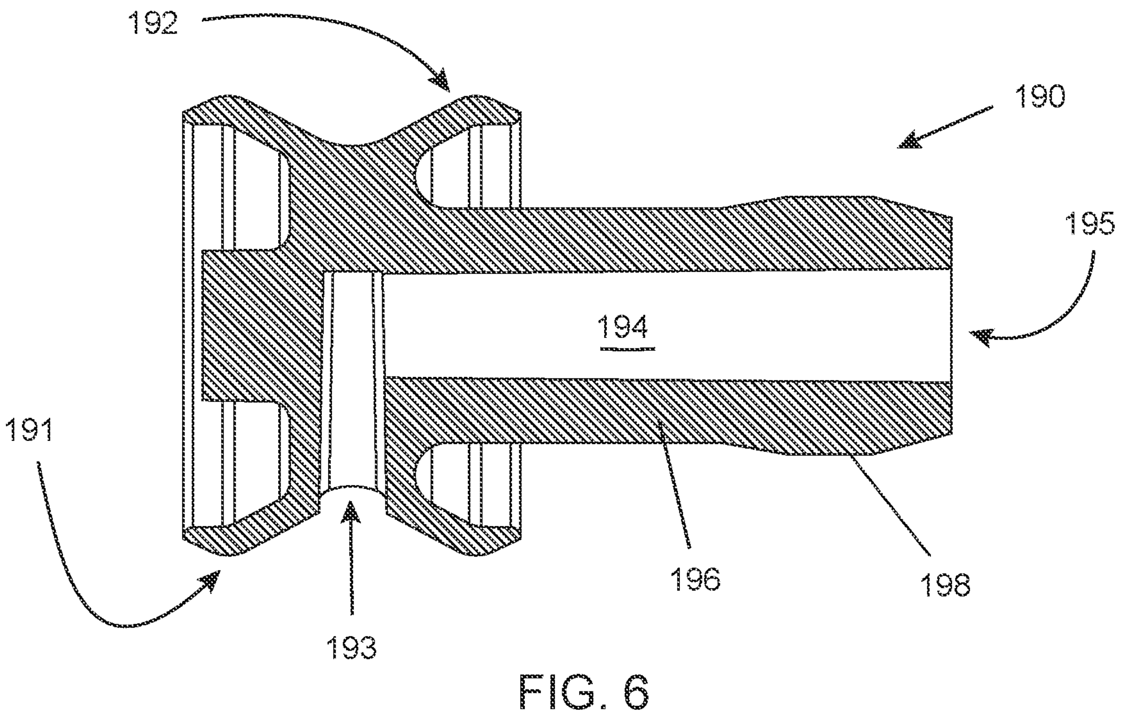
FIG. 6 illustrates a cross-sectional view of a vent piston according to certain embodiments of the invention.

A vent piston 190 according to embodiments of the invention is illustrated in FIG. 6. As illustrated, a vent piston 190 may include a vent piston body 196 having a vent piston open end 195 on one end of the vent piston 190 and a closed end opposite the vent piston open end 195. A first annular vent seal 191 may extend off of the closed end of the vent piston 190. A second annular vent seal 192 may be located between the first annular vent seal 191 and the vent piston open end 195. A vent path 194 through the vent piston 190 may extend from the vent piston open end 195 to a vent path port 193 extending through the vent piston body 196. In certain embodiments of the invention, the vent path port 196 is located between the first annular vent seal 191 and the second annular vent seal 192 as illustrated in FIG. 6. A portion of the vent piston body 196 adjacent the vent piston open end 195 may be narrower or wider than other portions of the vent piston body 196 and may be configured to mate with a piston 170.

According to embodiments of the invention, a vent piston seat 179 and a piston seat or a portion of a vent piston 190 are configured to connect the piston 170 to a vent piston 190. For example, the piston 170 illustrated in FIG. 5 may be coupled to the vent piston 190 illustrated in FIG. 6 and then assembled in the trigger sprayer 100 illustrated in FIG. 1. In such configuration, a piston seat or portion of the vent piston 190 is inserted into the air passageway 172 of the piston 170 such that the vent piston 190 seats in the vent piston seat 179 of the piston 170. Such coupling may be achieved during an assembly process wherein the open portion of the second end of the piston 170 receives the vent piston open end 195, compressing the vent piston open end 195 until the vent piston open end 195 and a portion of the vent piston body 196 are inserted into the piston 170. A part of the vent piston body 196 adjacent the vent piston open end 194 may be thicker or have a greater dimension than the rest of the vent piston body 196 such that when that portion is inserted into the vent piston seat 179 of the piston 170, the vent piston 190 is secured to the piston 170.

The vent piston seat 179 and a piston seat or exterior portion of the vent piston body 196 may include corresponding ridges and cut-outs or corresponding features meant to help secure the vent piston 190 with a piston 170 when assembled together. For example, as illustrated in FIGS. 5 and 6, the vent piston body 196 includes a portion adjacent the vent piston open end 195 having a diameter that is greater than the diameter of the rest of the vent piston body 196. The diameter and shape of that portion of the vent piston 190 is selected to fit within the vent piston seat 179 which has a matching shape such that the vent piston seat 179 can accept the vent piston 190 and retain the vent piston 190 with the piston 170 as illustrated in FIG. 1.

Figure 7:
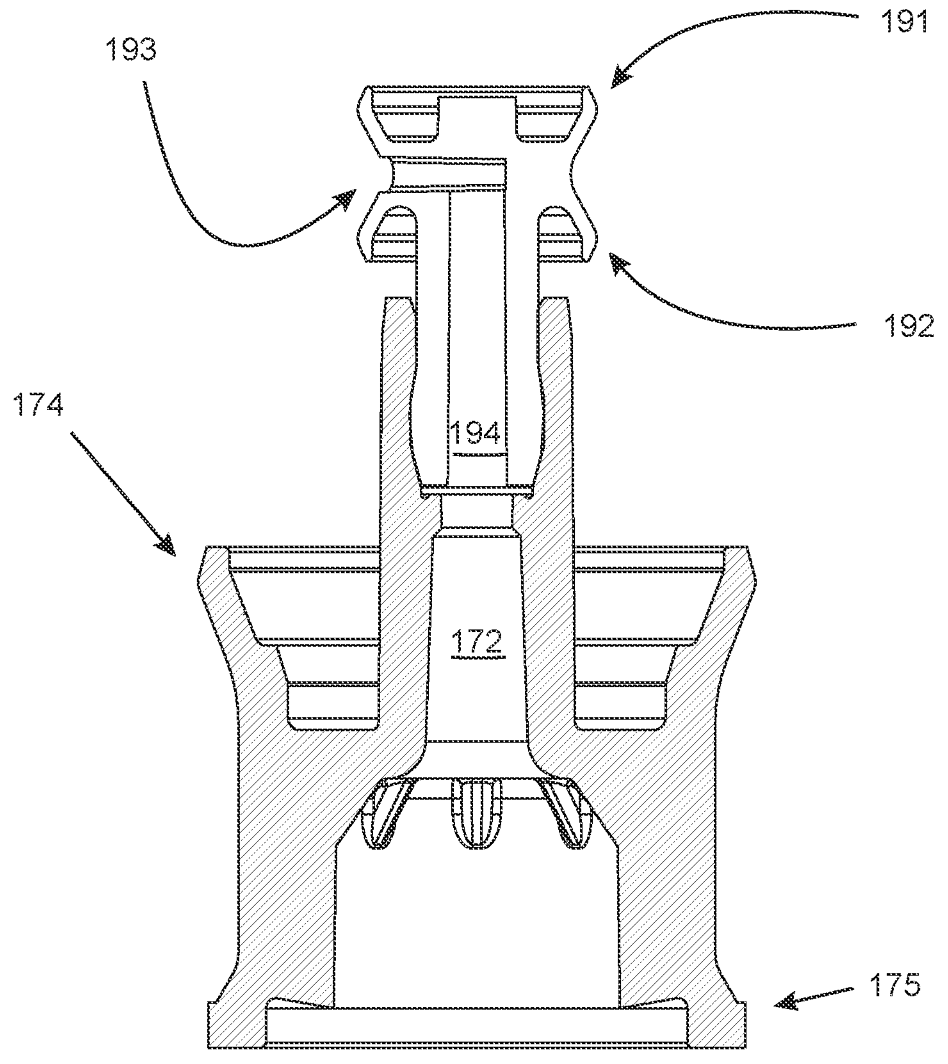
FIG. 7 illustrates a cross-sectional view of an assembled piston and vent piston according to certain embodiments of the invention.

An assembled piston 170 and vent piston 190 is illustrated in FIG. 7. While the configuration illustrated shows the vent piston 190 being inserted into the piston 170, other configurations can also be used with various embodiments of the invention. In some embodiments, a projection off of the piston 170 may be inserted into the vent piston 190 such that the vent piston 190 encircles a portion of the piston 170. In other embodiments, the vent piston 190 and piston 170 may include other engagement or locking features to ensure that once assembled, the piston 170 and vent piston 190 will not decouple or separate from each other. Such features may include snap beads, bayonet connections, snap connections, threaded connections, or other conventional connection features. In still other embodiments of the invention, the vent piston 190 and piston 170 may be coupled outside of the air passageway 172 but providing a continuous flow path between the air passageway 172 of the piston 170 and the vent path 194 of the vent piston 190.

A trigger sprayer 100 in a rest position or unactuated position according to various embodiments of the invention is illustrated in FIG. 1. That same trigger sprayer 100 is illustrated in an actuated position in FIG. 8. As shown in FIG. 1, the vent path between an interior of a bottle or container to atmosphere is closed because the fluid or gaseous path between an interior of the bottle or container through the venting space 151 of the valve body 110 and into the vent bore 120 is stopped by the contact of the first annular vent seal 191 against the interior vent bore surface 126. As the trigger sprayer 100 illustrated in FIG. 1 is actuated, the piston 170 and vent piston 190 move into the position illustrated in FIG. 8. As the first annular vent seal 191 passes over the one or more vent ports 123 in the vent bore 120, a venting path is opened between atmosphere and an interior of the bottle or container to which the trigger sprayer 100 is attached. For instance, the atmospheric venting path through trigger sprayer 100 in the actuated position is shown by line AVP-AVP in FIG. 8. That line represents the path opened upon actuation of the trigger sprayer 100, allowing air to flow from atmosphere through the piston 170, through the vent piston 190, through at least one vent port 123, into the venting space 151 and into a bottle or container attached to the trigger sprayer 100.

Figure 9:
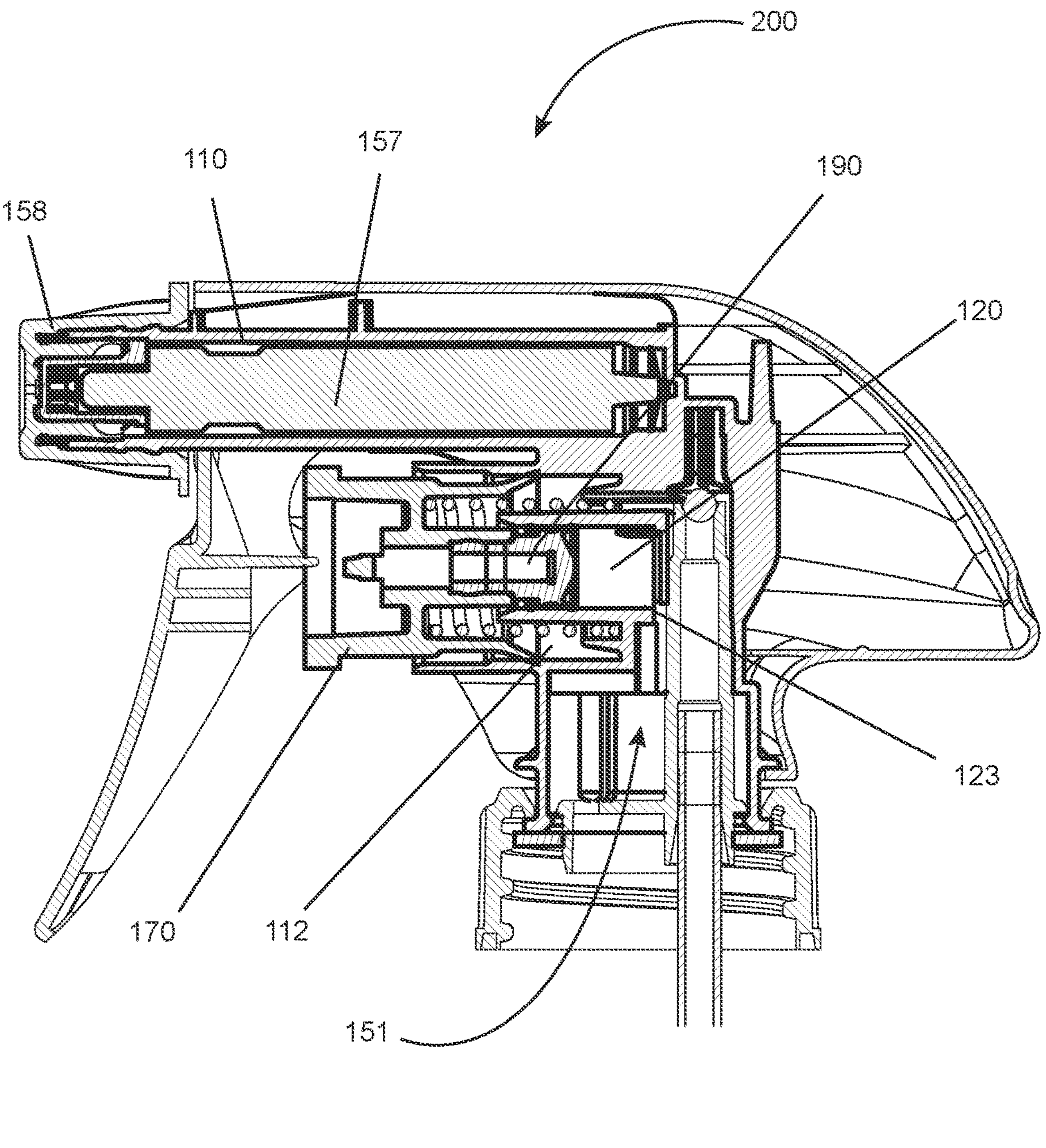
FIG. 9 illustrates a cross-sectional view of a trigger sprayer according to certain embodiments of the invention in a resting state.
Figure 10:
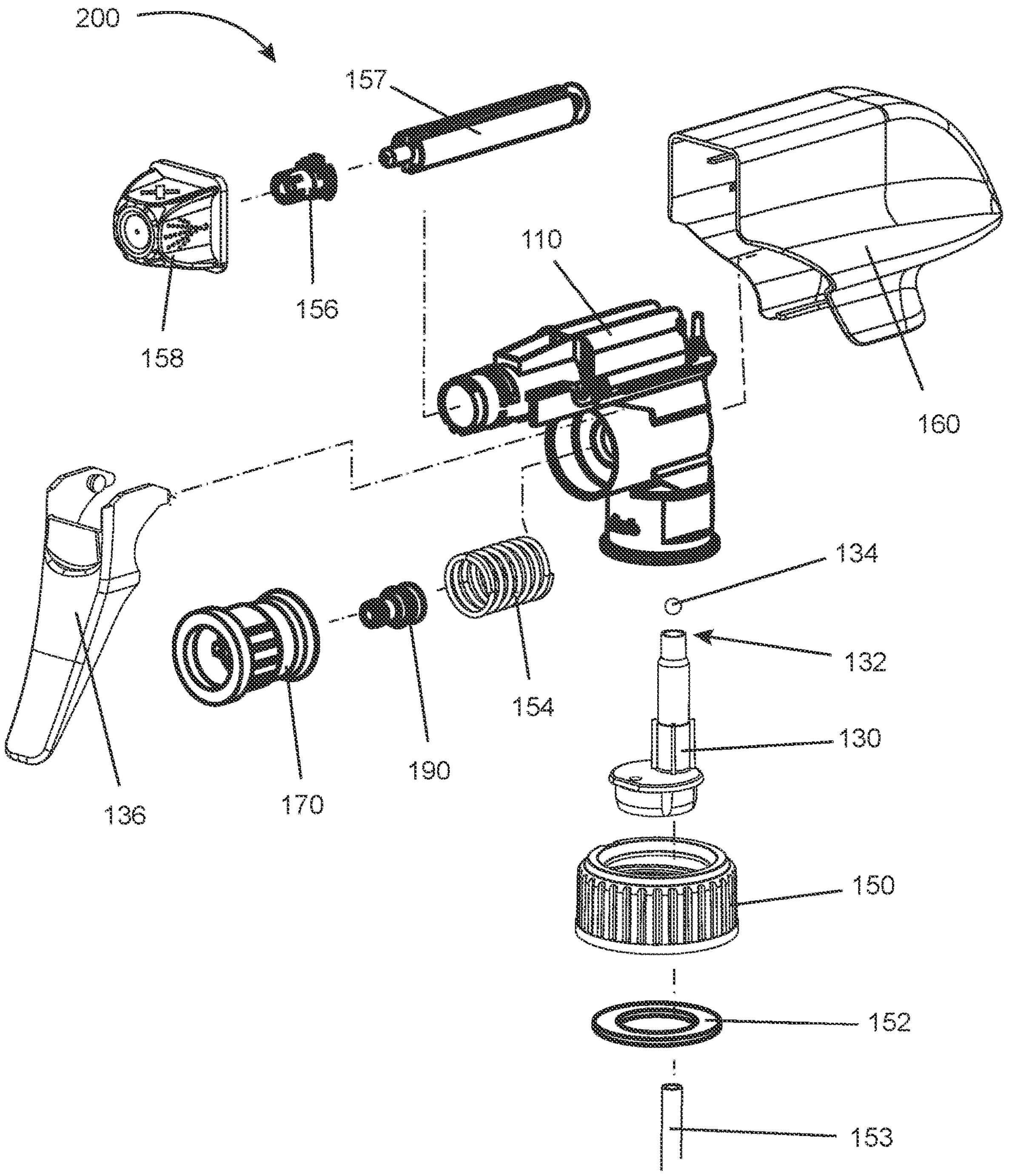
FIG. 10 illustrates a blown-apart assembly drawing of the trigger sprayer illustrated in FIG. 9 according to various embodiments of the invention.
Figure 11:
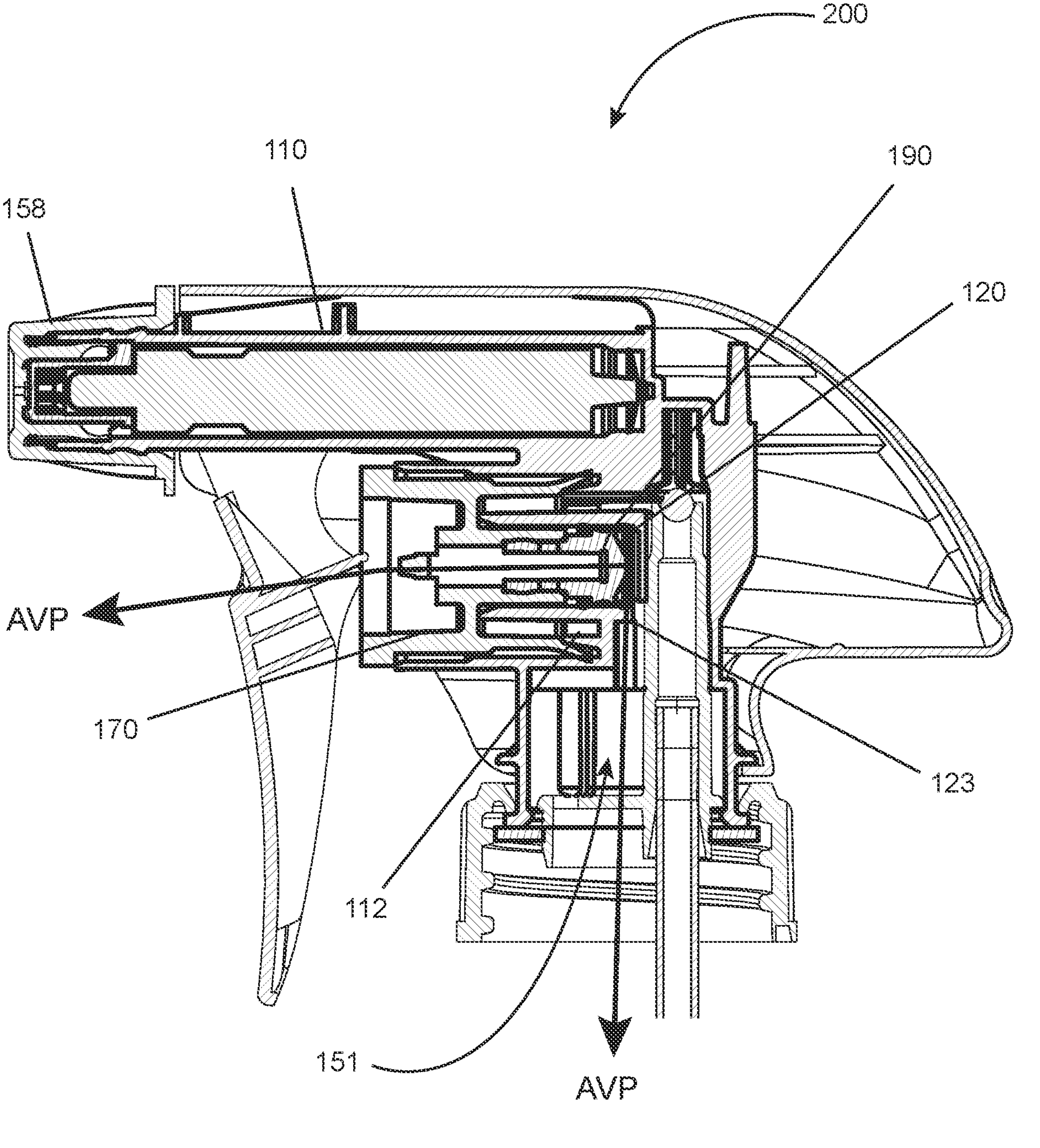
FIG. 11 illustrates a cross-sectional view of the trigger sprayer illustrated in FIG. 9 in an actuated state.

An alternate version or configuration of a trigger sprayer 200 according to various embodiments of the invention is illustrated in FIGS. 9 through 11. While configured differently than the trigger sprayer 100 illustrated in FIGS. 1 and 2 and including other components, the trigger sprayer 200 includes a vent bore 120 and a vent piston 190 similar to those used with other invention embodiments.

As illustrated, a trigger sprayer 200 according to various embodiments of the invention may include a valve body 110 to which other conventional trigger sprayer components are assembled to create an operable trigger sprayer 200. For instance, the trigger sprayer 200 may include a vent piston 190 attached to a piston 170 and inserted in the vent bore 120 and piston bore 112 of the valve body 110 according to embodiments of the invention. A trigger 136 may be attached to the valve body 110 or the shroud 160 and to the piston 170 to allow movement of the piston 170 and vent piston 190 within the piston bore 112 and vent bore 120, respectively. A spring 154 may be positioned in the valve body 110 to act against the piston 170. As illustrated in FIGS. 9 and 10, a spring 154 may include a metal or plastic coil spring. In other embodiments of the invention, other springs 154 may be used, for example, a spring acting on the trigger 136 and the valve body 110 similar to conventional plastic springs may be used with embodiments of the invention. A tube retainer 130 having a valve seat 132 may support a valve 134, such as a ball valve, spider valve or other valve configuration, to control flow of liquid or product into the trigger sprayer 200. A dip tube 153 may be attached to the tube retainer 130 to provide a path for liquid to flow from a container or bottle into the trigger sprayer 200. In other embodiments where the trigger sprayer 200 is being attached to a bottle having a blown-in dip tube, a dip-tube connector may be used with the tube retainer 130 or in place of the tube retainer 130 to connect the trigger sprayer 200 to the blow-in dip tube of such bottle or container. A closure 150 and gasket 152 may also be used in a conventional fashion to attach the trigger sprayer 200 to a bottle or container. The trigger sprayer 200 may also include a nozzle 158 attached to a discharge end of the valve body 110 and a spin mechanic insert 156 may be held against an opening in the valve body 110 by the nozzle 158. The trigger sprayer 200 illustrated in FIGS. 9 through 11 also includes a pre-compression valve and spacer 157 inserted in the discharge passageway of the valve body 110.

Unlike conventional trigger sprayers, the trigger sprayer 200 includes a valve body 110 having a piston bore 112 and a vent bore 120. The vent bore 120 may be partially or fully enclosed by the piston bore 112. A piston 170 and vent piston 190 assembly may be seated in the piston bore 112 and vent bore 120 as illustrated in FIG. 9, which shows an assembled trigger sprayer 200 at rest and in an unactuated position. Actuation of the trigger sprayer 200 moves the piston 170 and the vent piston 190 such that the first annular vent seal 191 eventually passes over the one or more vent ports 123 in the vent bore 120, allowing air or atmosphere to pass through the air passageway 172 of the piston 170, through the vent path 194 of the vent piston 190, and into the at least one vent port 123 into an interior space or venting space 151 of the valve body 110, allowing the interior of the bottle or container to equilibrate with atmospheric pressure. A trigger sprayer 200 in an actuated position is illustrated in FIG. 11 and the venting path or route through the trigger sprayer 200 is illustrated along line AVP-AVP.

While particular trigger sprayer 100, 200 configurations and components are illustrated for various embodiments of the invention, it is understood that a vent bore 120 and vent piston 190 may be incorporated into other trigger sprayer configurations. For example, a trigger sprayer 100, 200 according to embodiments of the invention may include any components found in traditional trigger sprayers combined with a modified piston 170 and a vent piston 190 such as those illustrated in FIGS. 1 and 9 and a piston bore 112 including a vent bore 120 as in other embodiments of the invention. A valve body of a conventional trigger sprayer may be modified to include a piston bore 112 having a vent bore 120 seated therein and a vent piston 190 may be incorporated into or attached to a piston 170 to operate in a manner according to the embodiments of the invention.

Figure 8:
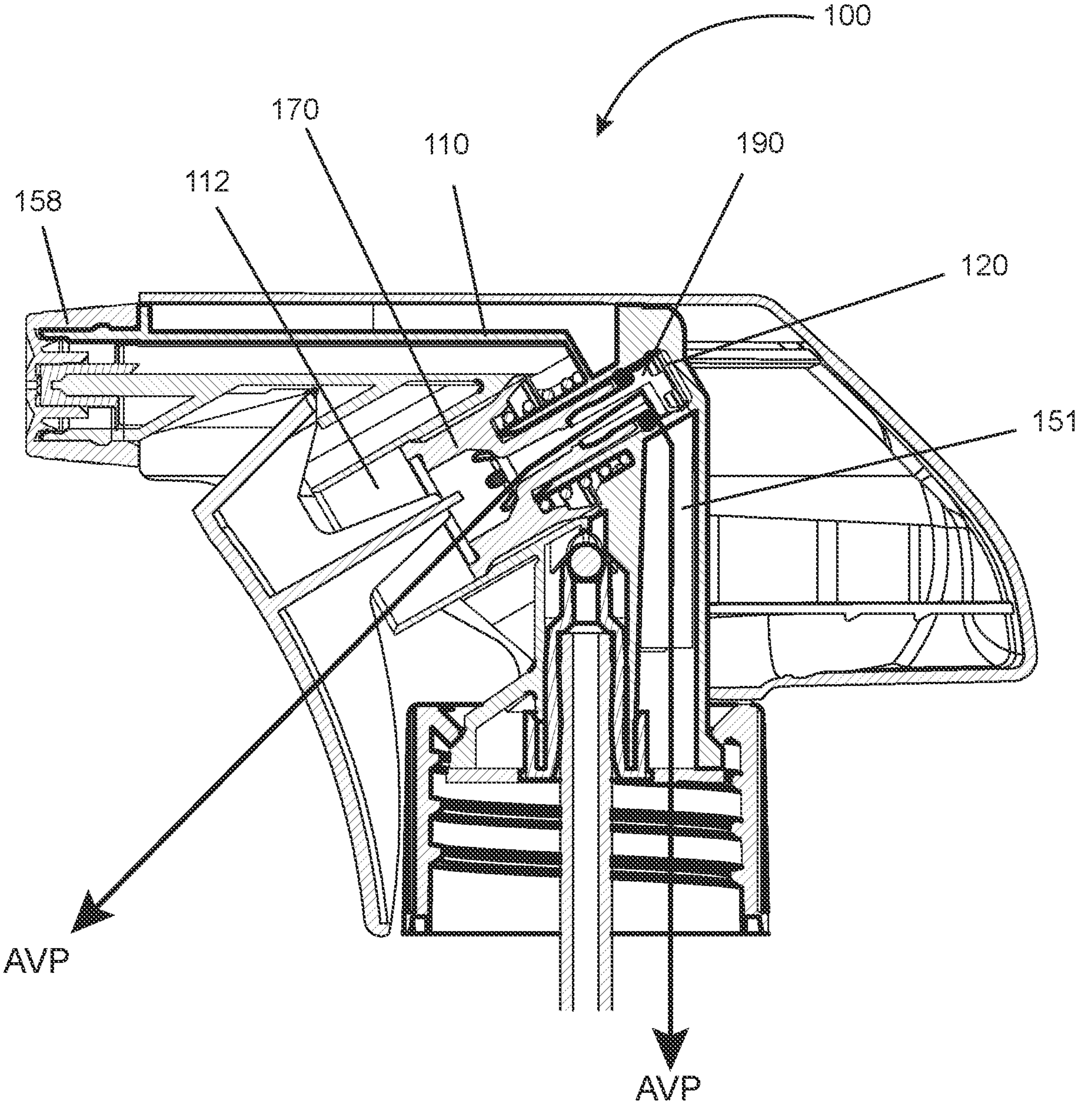
FIG. 8 illustrates a cross-sectional view of the trigger sprayer illustrated in FIG. 1 in an actuated state.

A piston 170 and vent piston 190 may be assembled together and then assembled with a trigger sprayer 100, 200 as illustrated in FIGS. 1 and 8. Upon assembly, the vent piston 190 is seated in the vent bore 120 and the piston 170 is seated in the piston bore 112. Other components of the trigger sprayer 100 may be assembled in a conventional manner such that a trigger sprayer 100 having a vent piston 190 seated in a vent bore 120 is produced. For example, the trigger sprayer 100 components illustrated in FIGS. 2 and 10 may be assembled together to produce a trigger sprayer 100, 200 that may be mounted to a bottle or container having a product therein and the trigger sprayer 100, 200 may be used to disperse the product therefrom.

A trigger sprayer 100, 200 according to various embodiments of the invention may be operated in the same manner as a conventional trigger sprayer. Once connected to a bottle or container containing a product, the trigger 136 of the trigger sprayer 100, 200 may be actuated to move the piston 170. Movement of the piston 170 also moves the vent piston 190 within the vent bore 120. When the trigger 136 is fully actuated, the vent piston 190 is in a position in which the vent path port 193 is in gaseous or fluid communication with at least one vent port 123 such that air may flow through the air passageway 172 of the piston 170, into the vent path 194 of the vent piston 190, out the vent path port 193, through at least one vent port 123 and into a venting space 151 formed in the valve body 110 that is in communication with an interior of the bottle or container such that the interior of the bottle or container is vented or equalized to atmospheric pressure. Upon release of the actuation force on the trigger 136, a spring 154 may return the piston 170 to its rest position. Movement of the piston 170 moves the vent piston 190 such that the vent path port 193 is no longer in communication with the at least one vent port 123, stopping the venting of the bottle or container.

At rest, a vent path from an interior of the bottle or container to which a trigger sprayer 100, 200 according to an embodiment of the invention is attached is closed or scaled such that air does not flow from atmosphere into the bottle or container. In addition, the vent path helps to prevent the leakage of product from the bottle or container out of the trigger sprayer 100, 200. For example, a trigger sprayer 100, 200 according to embodiments of the invention may be tipped over or turned on its side such that fluid or product from the bottle or container may flow into an interior of the vent bore 120 through the at least one vent port 123. However, the first annular vent seal 191 prevents the passage of any fluid from said interior of the vent bore 120 into the vent path port 193, thus preventing leakage through the vent path of the trigger sprayer 100.

In addition, it has been found that the inclusion of a second piston—the vent piston 190—and a second bore—the vent bore 120—in the trigger sprayer 100 helps to reduce leakage caused by deflection of a piston 170 during shipping or when forces equivalent to those experienced during shipping are applied to the trigger sprayer 100. During shipping tests, trigger sprayers 100, 200 configured with a vent bore 120 and vent piston 190 and a piston bore 112 and piston 170 as in the various embodiments of the invention failed to leak. Even when the forces applied to the trigger sprayers 100, 200 were sufficient to deflect pistons seals in conventional trigger sprayers, the presence of the additional first annular vent seal 191 and the second annular vent seal 192 in the vent piston 190 of the trigger sprayers 100, 200 of the present invention prevented fluid from bypassing all of the annular seals and leaking.

Figure 12:
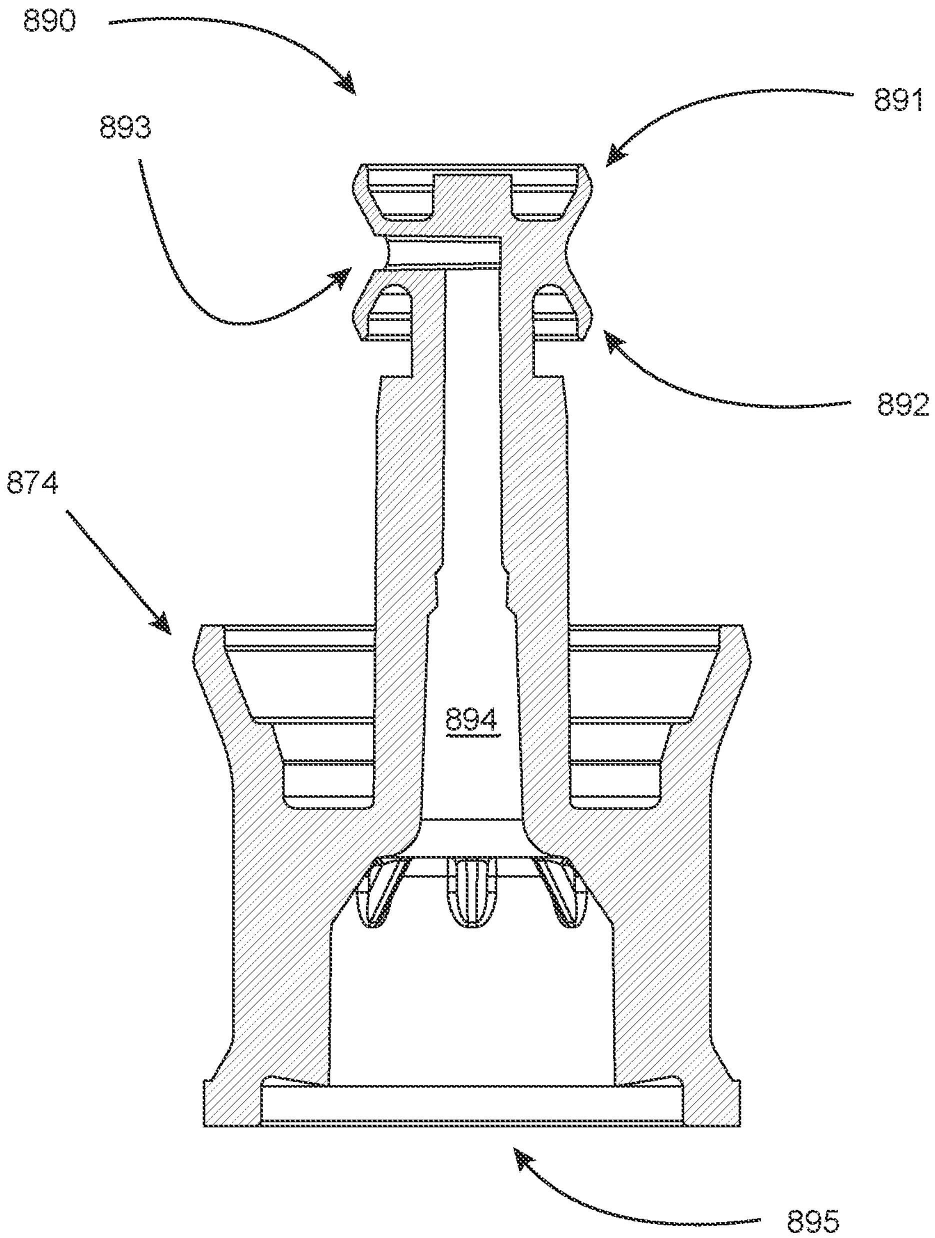
FIG. 12 illustrates a venting piston according to various embodiments of the invention.

While certain embodiments of the invention include a separate piston 170 and vent piston 190, some embodiments may include a venting piston 890 wherein the features of the piston 170 and the vent piston 190 are combined in a single component as illustrated in FIG. 12. The venting piston 890 according to certain embodiments of the invention includes a piston open end 895 and a vent path port 893 which are connected by a vent path 894 through which a fluid or gas may flow. A first annular vent seal 891 may be located on a first end of the venting piston 890 for engagement with the interior vent bore surface 126 of a vent bore 120 as in other embodiments of the invention. The venting piston 890 may also include a second annular vent seal 892 and the vent path port 893 may be located between the first annular vent seal 891 and the second annular vent seal 892. The venting piston 890 may also include at least one piston annular seal 874 configured to engage a piston bore interior surface 115 during operation of a trigger sprayer 100, 200 incorporating the use of the venting piston 890.

Figure 13:
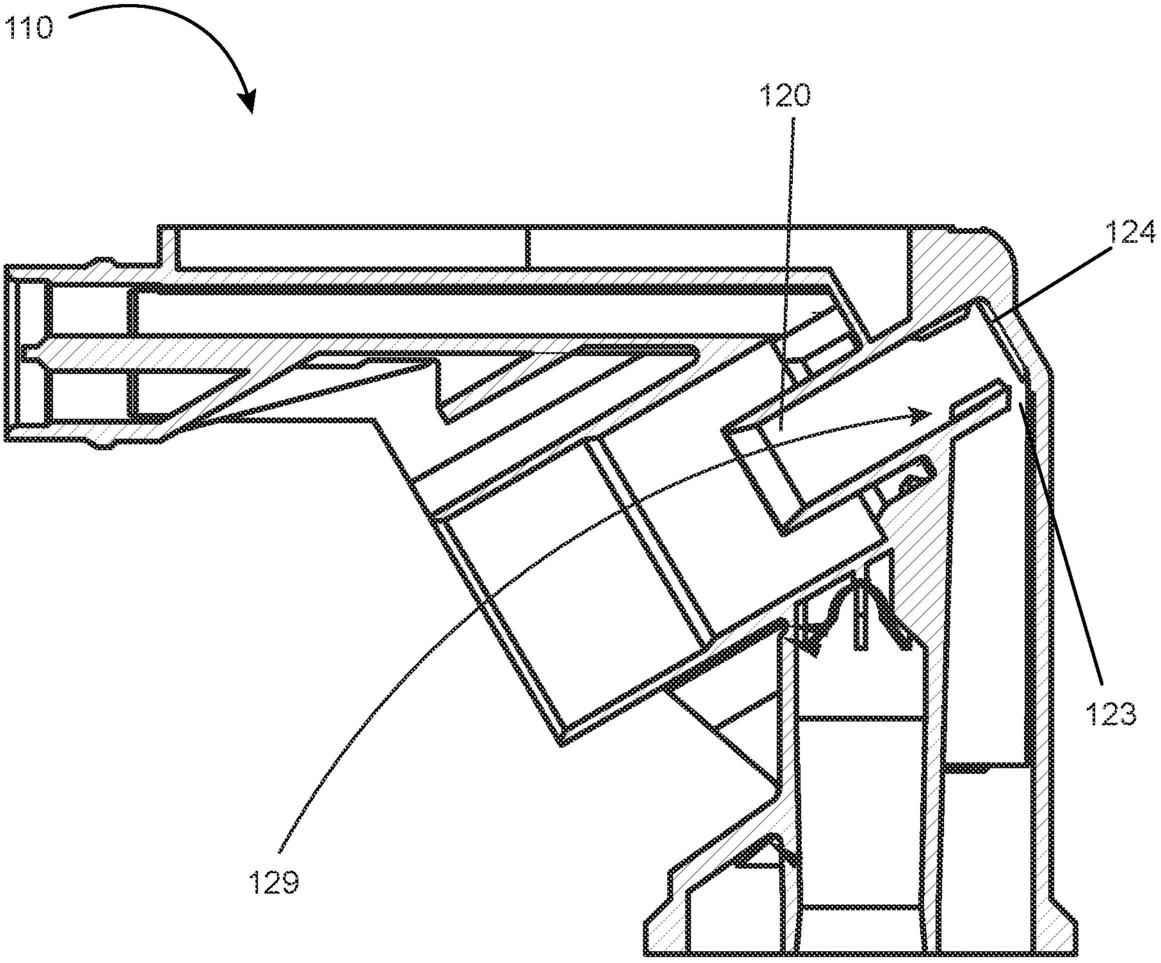
FIG. 13 illustrates a cross-sectional view of a valve body according to various embodiments of the invention.

In some other embodiments of the invention, a vent bore 120 may include one or more vent lips 129 on the interior vent bore surface 126 configured to engage the first annular vent seal 192 during operation of the trigger sprayer 100, 200 as illustrated in FIG. 13. Engagement of the first annular vent seal 192 with the one or more vent lips 129 disengages the seal between the first annular vent seal 192 and the interior vent bore surface 126 to allow a gaseous or fluid flow path past the first annular vent seal 192 to the vent path port 193. In such configurations, at least one vent port 123 may be located in different positions within the vent bore 120. While the at least one vent port 123 may be located in a similar positions as in other embodiments, a vent port 123 may also be located in the vent bore wall 124 or in the rear of the vent bore 120 in a position where it there is not enough room for an annular vent seal 191 of a vent piston 190 to sufficiently expose the vent port 123. The presence of one or more vent lips 129 facilitates the use of a vent port 123 in a position where it is impossible to create a vent port 123 capable of being within the movement or actuation path of the first annular vent seal 191.

The components used to make and assemble trigger sprayers 100, 200 according to embodiments of the invention may be made of conventional materials typically used for conventional trigger sprayers. For instance, resins, plastics, polymers, post-consumer recycled materials, and other materials that are conventionally used in molding processes may be used with various embodiments of the invention. Such materials may be used to make the valve bodies 110, pistons 170, and vent pistons 190 of the various embodiments of the invention.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A dispensing system, comprising:

a bottle;

a trigger sprayer, comprising:

a valve body, comprising:

a piston bore, comprising:
an opening in a first end;
a piston wall at a second end; and
a spring seat in the piston wall;
a vent bore within the piston bore, comprising:
an interior vent bore surface;
a vent bore opening at a first end;
a vent bore wall at a second end; and
at least one vent port adjacent the vent bore wall;
a neck portion;
an inner cylinder;
an inlet port providing an inlet fluid flow path between the inner cylinder and the piston bore;
a discharge passage;
a valve body fluid outlet at an end of the discharge passage;
an outlet port providing an outlet fluid path between the piston bore and the discharge passage;
a piston seated in the piston bore;
a vent piston connected to the piston and seated in the vent piston bore, the vent piston comprising:
a vent piston open end;
a first annular vent seal engaging the interior vent bore surface;
a second annular vent seal engaging the interior vent bore surface;
a vent path port opening between the first annular vent seal and the second annular vent seal; and
a vent path extending between the vent path port and the vent piston open end;
a spring seated in the spring seat and in contact with the piston;
a spin mechanic insert seated against the valve body fluid outlet;
a rotatable nozzle seated on the valve body adjacent the spin mechanic insert;
a shroud attached to the valve body;
a tube retainer seated in the inner cylinder, the tube retainer comprising a valve seat;
a valve seated in the valve seat;
a closure engaging a lower end of the neck portion; and
a gasket seated on an interior of the closure and in contact with the valve body; and
wherein the trigger sprayer is connected to the bottle by the closure.

2. The dispensing system of claim 1, further comprising a product in the bottle.

3. The dispensing system of claim 1, wherein the bottle further comprises a bottle neck portion and wherein the closure is fixed to the bottle neck portion.

4. The dispensing system of claim 1, wherein the bottle further comprises a bottle neck portion and wherein the closure is fixed to the bottle neck portion by a closure connection selected from the group consisting of a threaded closure and a bayonet closure.

5. A venting piston, comprising:
a piston body;
an opening in one end of the piston body;
a piston wall in the end of the piston body opposite the opening;
an air vent path port adjacent the piston wall; and
at least one annular vent seal adjacent the vent path port.

6. A venting piston, comprising:
a piston body;
an opening in one end of the piston body;
a piston wall in the end of the piston body opposite the opening;
a vent path port adjacent the piston wall; and
at least one annular vent seal adjacent the vent path port,
wherein the at least one annular seal further comprises:
a first annular vent seal;
a second annular vent seal; and
wherein the vent path port is positioned between the first annular vent seal and the second annular vent seal.

7. The venting piston of claim 5, wherein the venting piston is seated in a valve body of a trigger sprayer comprising:
a piston bore; and
a vent bore.

8. A venting piston, comprising:
a piston body;
an opening in one end of the piston body;
a piston wall in the end of the piston body opposite the opening;
a vent path port extending through the piston body adjacent the piston wall;
a vent path extending through the piston body from the opening to the vent path port; and
at least one annular vent seal adjacent the vent path port.

* * * * *